(12) United States Patent
Aota (10) Patent No.: US 9,727,281 B2
(45) Date of Patent: Aug. 8, 2017

(54) IMAGE PROCESSING APPARATUS, COMPUTER READABLE MEDIUM, AND IMAGE PROCESSING METHOD

(75) Inventor: Shinobu Aota, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 1204 days.

(21) Appl. No.: 13/234,707

(22) Filed: Sep. 16, 2011

(65) Prior Publication Data
US 2012/0206754 A1 Aug. 16, 2012

(30) Foreign Application Priority Data

Feb. 16, 2011 (JP) ................................. 2011-030805

(51) Int. Cl.
| | |
|---|---|
| G06F 11/34 | (2006.01) |
| G06F 9/445 | (2006.01) |
| G06F 3/12 | (2006.01) |
| G03G 15/00 | (2006.01) |
| H04N 1/32 | (2006.01) |

(52) U.S. Cl.
CPC ......... *G06F 3/121* (2013.01); *G03G 15/5087* (2013.01); *G03G 15/5091* (2013.01); *G06F 3/123* (2013.01); *G06F 3/1205* (2013.01); *G06F 3/1273* (2013.01); *G06F 3/1288* (2013.01); *G06F 8/61* (2013.01); *H04N 1/32625* (2013.01); *H04N 1/32662* (2013.01); *G03G 2215/00109* (2013.01); *G06F 3/1275* (2013.01);
(Continued)

(58) Field of Classification Search
CPC ..... G06F 8/61; G06F 8/62; G06F 8/63; G06F 8/64; G06F 3/121
See application file for complete search history.

(56) References Cited

U.S. PATENT DOCUMENTS

| | | | |
|---|---|---|---|
| 7,249,353 B2 * | 7/2007 | Zarco | 717/171 |
| 7,692,810 B2 * | 4/2010 | Ueda | H04N 1/00204 358/1.15 |

(Continued)

FOREIGN PATENT DOCUMENTS

| | | |
|---|---|---|
| JP | 10-260797 A | 9/1998 |
| JP | 2002-236576 A | 8/2002 |

(Continued)

OTHER PUBLICATIONS

Communication dated Sep. 22, 2014 from the Japanese Patent Office in counterpart application No. 2011-030805.

*Primary Examiner* — Brian W Wathen
(74) *Attorney, Agent, or Firm* — Sughrue Mion, PLLC (57) ABSTRACT

An image processing apparatus includes a receiving unit, an executing unit, a log information generating unit, a holding unit, and a transmitting unit. The receiving unit receives and installs one or more program information items for executing a preset process. The executing unit executes the preset process on the basis of at least one of the installed one or more program information items. The log information generating unit generates log information regarding the preset process based on the one or more program information items executed by the executing unit. The holding unit holds a transmission destination of the log information in association with each of the one or more program information items. The transmitting unit transmits the log information to the transmission destination associated with the executed one or more program information items.

20 Claims, 9 Drawing Sheets

(52) U.S. Cl.
 CPC .............. *H04N 2201/3202* (2013.01); *H04N 2201/3278* (2013.01)

(56) References Cited

U.S. PATENT DOCUMENTS

| | | | |
|---|---|---|---|
| 7,796,287 B2 * | 9/2010 | Fukuta ..................... | 358/1.15 |
| 8,368,933 B2 * | 2/2013 | Tsujimoto ................ | 358/1.15 |
| 8,488,135 B2 * | 7/2013 | Shimizu ............ | H04N 1/0035 |
| | | | 358/1.13 |
| 2012/0092691 A1 * | 4/2012 | Sasakuma ................ | 358/1.13 |

FOREIGN PATENT DOCUMENTS

| | | |
|---|---|---|
| JP | 2003-216558 A | 7/2003 |
| JP | 2003-300371 A | 10/2003 |
| JP | 2007-60404 A | 3/2007 |
| JP | 2009-194862 A | 8/2009 |
| JP | 2010-81011 A | 4/2010 |

\* cited by examiner

```
LOGIN

USER NAME  [ user1                    ]

PASSWORD   [ *****                    ]

[ LOGIN ]  [ CANCEL ]
```

FIG. 6

APPLICATION SOFTWARE TO BE INSTALLED

SERVER NAME [svr1]

APPLICATION NAME [apl1]

LOG INFORMATION TRANSMISSION SETTINGS

TRANSMISSION DESTINATION [user1@fujixerox.co.jp]

NUMBER OF EXECUTIONS [UP TO 100 ▶]

TRANSMISSION PERIOD [WITHIN ONE MONTH ▶]

TRANSMISSION TARGET [ERROR ONLY ▶]

[CANCEL]

[EXECUTE INSTALLATION]

FIG. 7

| USER NAME | ELECTRONIC MAIL ADDRESS |
|---|---|
| user1 | user1@fujixerox.co.jp |
| user2 | user2@fujixerox.co.jp |
| user3 | user3@fujixerox.co.jp |
| ⋮ | ⋮ |
| ⋮ | ⋮ |
| ⋮ | ⋮ |

FIG. 8

| APPLICATION NAME | TRANSMISSION DESTINATION | NUMBER OF EXECUTIONS | TRANSMISSION PERIOD | TRANSMISSION TARGET |
|---|---|---|---|---|
| apl1 | user1@fujixerox.co.jp | 100 | ONE MONTH | ERROR ONLY |
| apl2 | user2@fujixerox.co.jp | 200 | TWO MONTHS | ERROR ONLY |
| apl3 | user3@fujixerox.co.jp | 300 | ONE MONTH | ALL OPERATIONS |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |

FIG. 9

IMAGE PROCESSING APPARATUS, COMPUTER READABLE MEDIUM, AND IMAGE PROCESSING METHOD

CROSS-REFERENCE TO RELATED APPLICATIONS

This application is based on and claims priority under 35 USC 119 from Japanese Patent Application No. 2011-030805 filed Feb. 16, 2011.

BACKGROUND

TECHNICAL FIELD

The present invention relates to an image processing apparatus, a computer readable medium, and an image processing method.

SUMMARY

According to an aspect of the invention, there is provided an image processing apparatus including a receiving unit, an executing unit, a log information generating unit, a holding unit, and a transmitting unit. The receiving unit receives and installs one or more program information items for executing a preset process. The executing unit executes the preset process on the basis of at least one of the installed one or more program information items. The log information generating unit generates log information regarding the preset process based on the one or more program information items executed by the executing unit. The holding unit holds a transmission destination of the log information in association with each of the one or more program information items. The transmitting unit transmits the log information to the transmission destination associated with the executed one or more program information items.

BRIEF DESCRIPTION OF THE DRAWINGS

Exemplary embodiments of the present invention will be described in detail based on the following figures, wherein.

DETAILED DESCRIPTION

Exemplary embodiments of the invention will now be described in detail with reference to the drawings.

Figure 1:
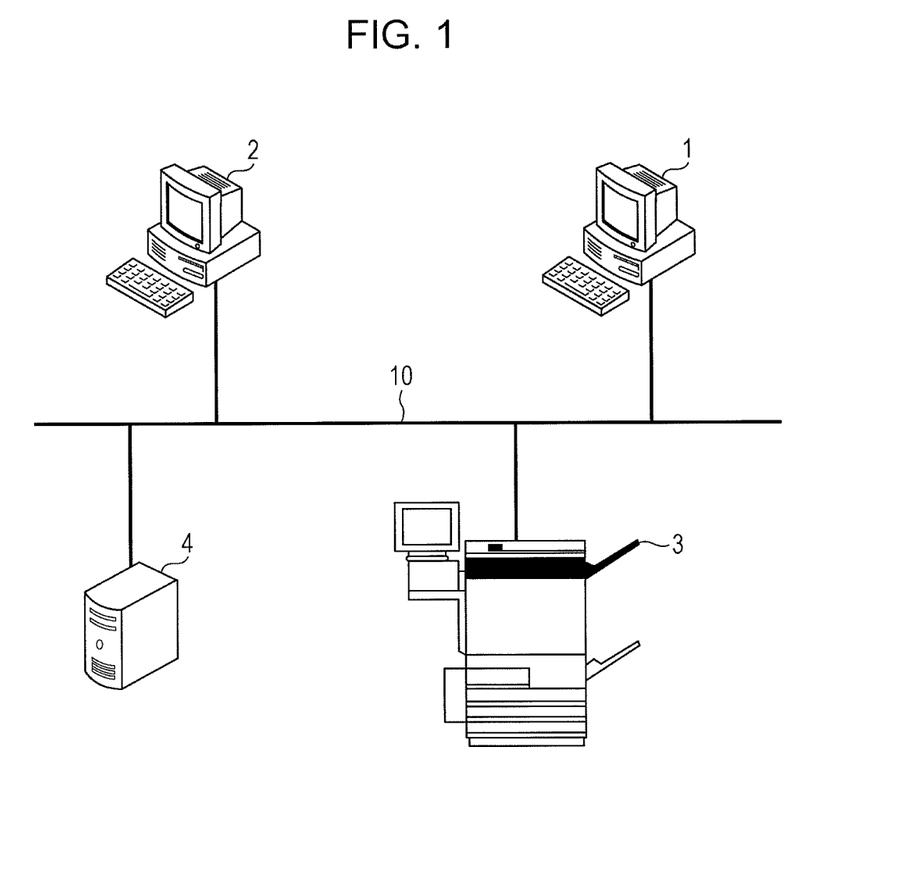
FIG. 1 is a diagram illustrating a configuration of a printing system in an exemplary embodiment of the invention.

FIG. 1 is a diagram illustrating a printing system of an exemplary embodiment of the invention.

As illustrated in FIG. 1, in the printing system of the present exemplary embodiment, each of a terminal apparatus 1, a terminal apparatus 2, and a server 4 is connected to an image processing apparatus 3 through a network 10.

The image processing apparatus 3 of the present exemplary embodiment is configured to allow application software (program information, hereinafter abbreviated as application) created by a user to be installed and executed therein. For example, if an application for executing a series of operations, such as transmission of scanned image data to a specific address and printing on a specified number of sheets, has been created and installed in the image processing apparatus 3, a user is allowed to cause the image processing apparatus 3 to execute the preset series of operations simply by selecting and executing the application.

An application developed by a user, however, is not necessarily sufficiently verified in advance. As a result, a trouble such as an error may occur when the application is installed and executed in the image processing apparatus 3.

If an error occurs in the application executed by the image processing apparatus 3, therefore, it is necessary to collect log information (history information) and correct the failure of the application.

In the present exemplary embodiment, description will be made of a case in which an application is created in the terminal apparatus 1 and transmitted to the server 4 via the network 10 to be stored in the server 4, and in which the image processing apparatus 3 installs therein the application from the server 4 and sets the terminal apparatus 2 as the transmission destination of the log information in the event of, for example, an error in the execution of the installed application.

In some cases, an image processing apparatus, such as a multifunctional machine, holds an electronic mail address of a user or a server address of a server for storing data as the transmission destination of the scanned image data. It is assumed in such cases that a terminal apparatus serving as the transmission destination receives a relatively large volume of data, such as image data. Thus, a relatively large data size of the log information presents little problem.

Subsequently, a configuration of hardware of the image processing apparatus 3 will be described in detail with reference to FIG. 2.

Figure 2:
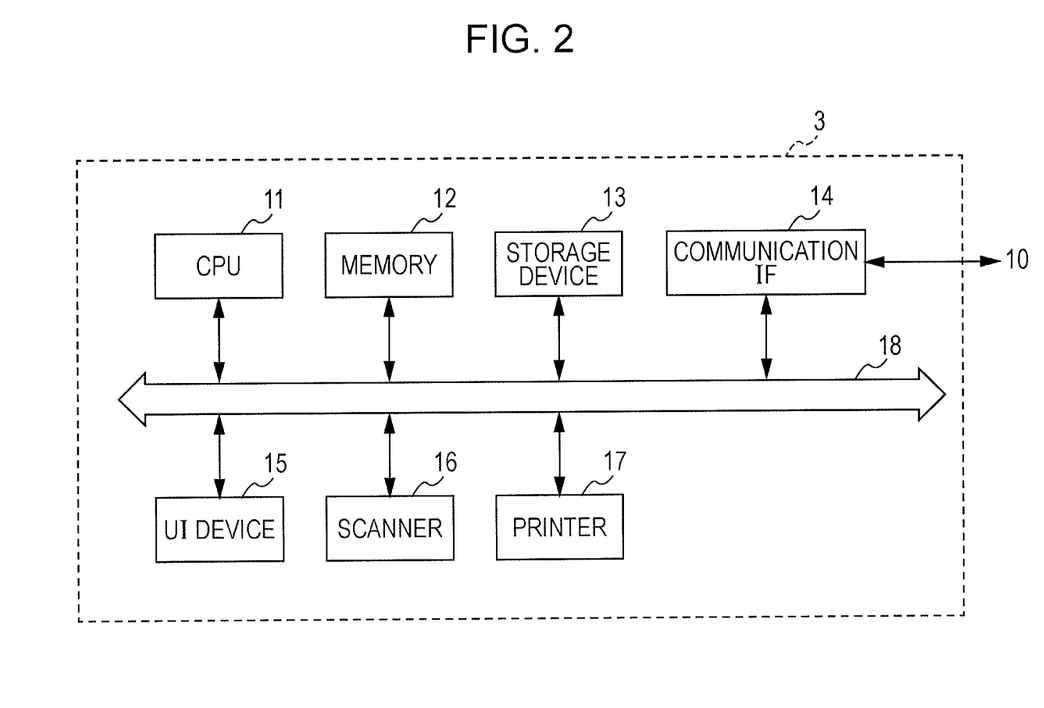
FIG. 2 is a block diagram illustrating a configuration of hardware of an image processing apparatus in the exemplary embodiment of the invention.

As illustrated in FIG. 2, the image processing apparatus 3 includes a CPU (Central Processing Unit) 11, a memory 12, a storage device 13 such as an HDD (Hard Disk Drive), a communication IF (Interface) 14 which transmits and receives data to and from, for example, an external device via the network 10, a UI (User Interface) device 15 including a touch panel or a liquid crystal display and a keyboard, a scanner 16, and a printer 17. These constituent elements are connected to one another via a control bus 18.

The CPU 11 executes a predetermined process on the basis of a control program stored in the memory 12 or the storage device 13, to thereby control the operation of the image processing apparatus 3. In the above description of the present exemplary embodiment, the CPU 11 reads and executes the control program stored in the memory 12 or the storage device 13. However, the program may also be stored in a storage medium, such as a CD-ROM (Compact Disc-Read Only Memory), and provided to the CPU 11.

Figure 3:
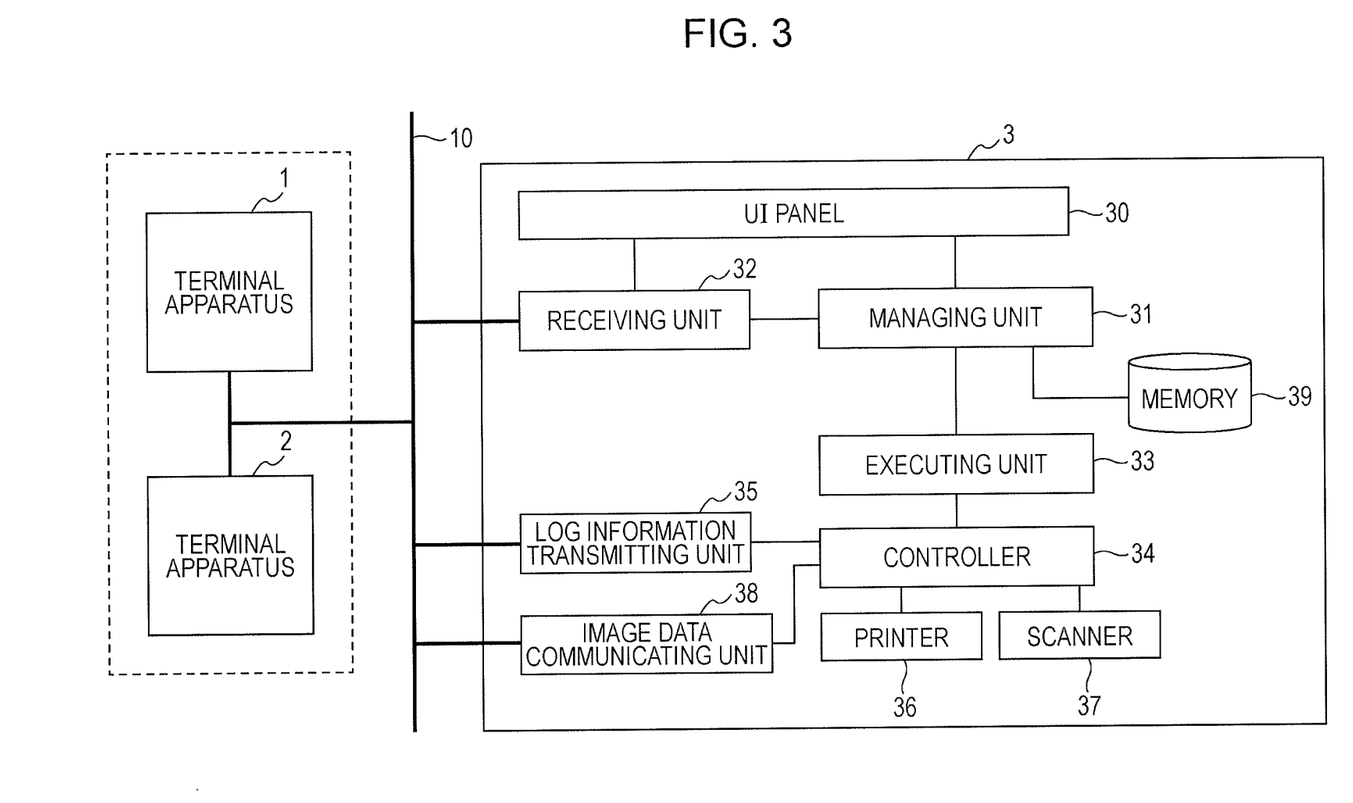
FIG. 3 is a block diagram illustrating a functional configuration of the image processing apparatus in the exemplary embodiment of the invention.

FIG. 3 is a block diagram illustrating a functional configuration of the image processing apparatus 3 realized by the execution of the above-described control program.

As illustrated in FIG. 3, the image processing apparatus 3 is configured to include a managing unit 31, a receiving unit 32, an executing unit 33, a controller 34, a log information transmitting unit 35 which transmits log information, a printer 36, a scanner 37, an image data communicating unit 38, a memory 39 which stores user information and transmission destination information, and a UI (User Interface) panel 30 for performing the operation and setting of the image processing apparatus 3.

The receiving unit 32 receives the application created by the terminal apparatus 1 and stored in the sever 4, and installs the application to be usable.

The memory 39 stores the application installed by the receiving unit 32 and the user information including transmission destination information of image data.

When the application is installed by the receiving unit 32, the managing unit 31 performs a login process for identifying a user on the basis of the user information, such as a user name and a password, input from the UI panel 30. In this process, the managing unit 31 refers to the memory 39, and determines whether or not the user information of the user identified in the login process is stored in the memory 39.

Further, when the application is installed by the receiving unit 32, the managing unit 31 sets the transmission destination and conditions of the log information for the application, and manages the transmission destination and conditions in association with one another after the completion of the installation of the application. Further, when the user information is to be deleted from the memory 39, the managing unit 31 deletes the transmission destination of the log information of the application set on the basis of the transmission destination information of the user information to be deleted.

The executing unit 33 executes a process based on the installed application, and the controller 34 controls the log information transmitting unit 35, the printer 36, and the scanner 37 on the basis of the process of the executing unit 33.

The image processing apparatus 3 further includes a not-illustrated log generating unit which generates log information. The log generating unit generates information regarding the operation of the application and information regarding an error occurring in the course of processing, and records the information as a log file. Further, if the application includes a process regarding an operation performed by the user on, for example, the image processing apparatus 3 (operation of buttons on the touch panel, for example), information regarding the operation by the user may be recorded as the log information.

If the application is executed by the executing unit 33, the log information transmitting unit 35 transmits the log information of the executed application to the transmission destination set for the application.

The printer 36 captures the image read by the scanner 37 or the image transmitted by the image data communicating unit 38 via the network 10, and performs a printing operation on the basis of the control of the controller 34.

In the present exemplary embodiment, description will be made of a case in which the terminal apparatus 1 creates an application that, if an image is read by the scanner 37, causes the image data communicating unit 38 to transmit the read image to the terminal apparatus 2 via the network 10 and causes the printer 36 to output the read image on a sheet, and in which the application is used in the image processing apparatus 3.

Figure 4:
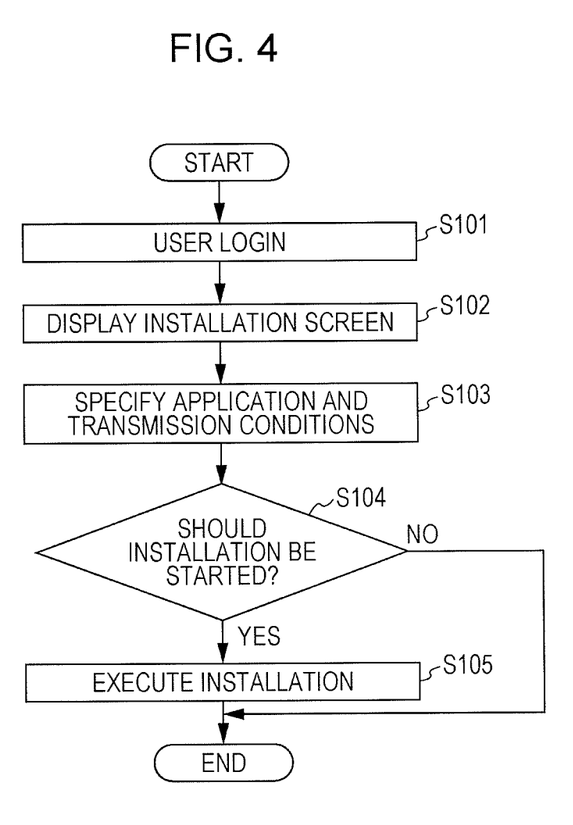
FIG. 4 is a flowchart for explaining a flow of an installation process in the exemplary embodiment of the invention.

Subsequently, a procedure of installing the above-described application created by the terminal apparatus 1 into the image processing apparatus 3 will be described in detail with reference to FIG. 4.

Figure 5:
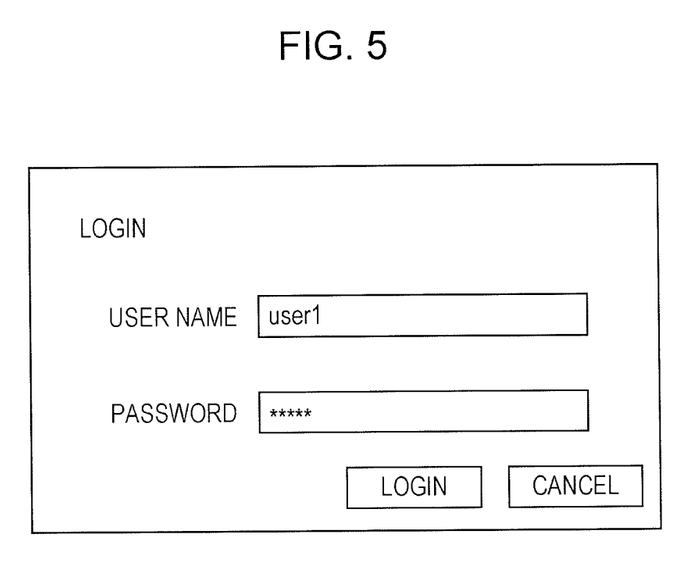
FIG. 5 is a diagram illustrating an example of a login screen in the exemplary embodiment of the invention.

Login to the image processing apparatus 3 is performed before the application created by the terminal apparatus 1 and stored in the server 4 is installed into the image processing apparatus 3 (Step S101). In this process, a login screen as illustrated in FIG. 5 is displayed on the UI panel 30 of the image processing apparatus 3. When a user inputs a user name and a password and presses a login button on the login screen, the managing unit 31 permits the login.

Figure 6:
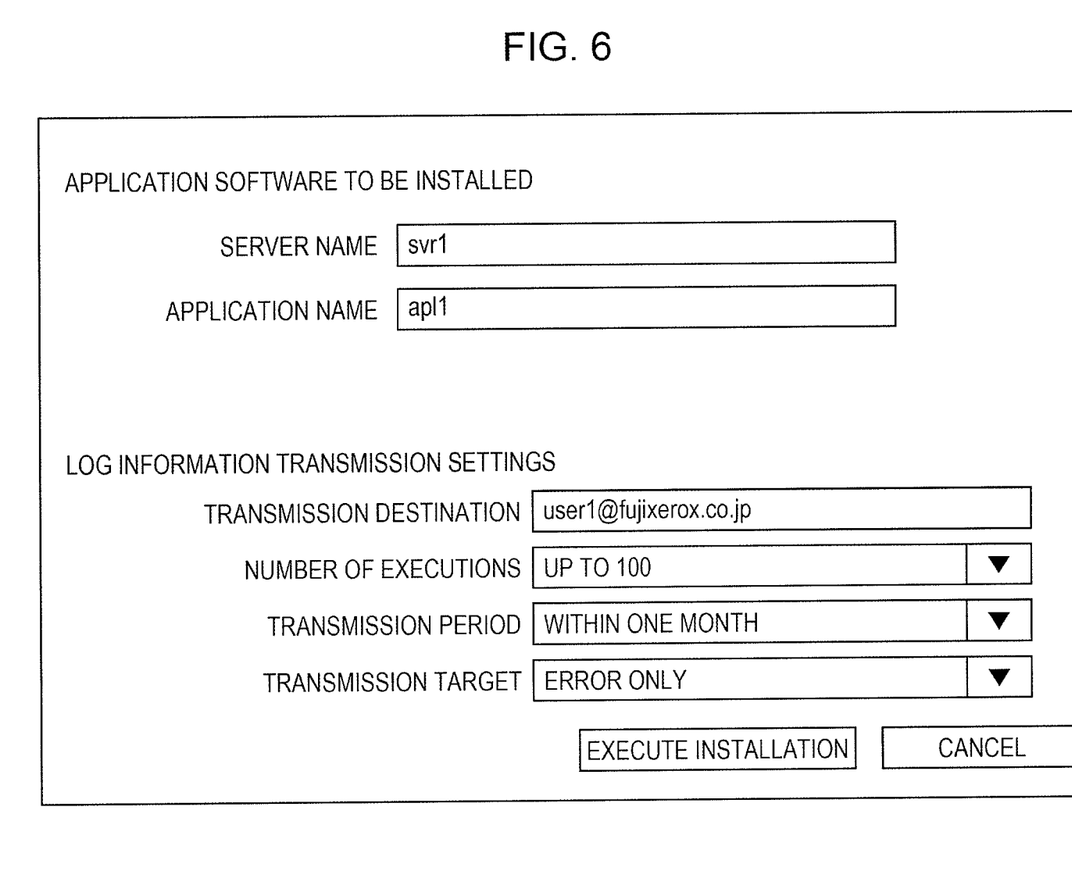
FIG. 6 is a diagram illustrating an example of an installation screen in the exemplary embodiment of the invention.

After the login is permitted, the managing unit 31 identifies the user, and an installation screen as illustrated in FIG. 6 is displayed on the UI panel 30 (Step S102).

Figure 7:
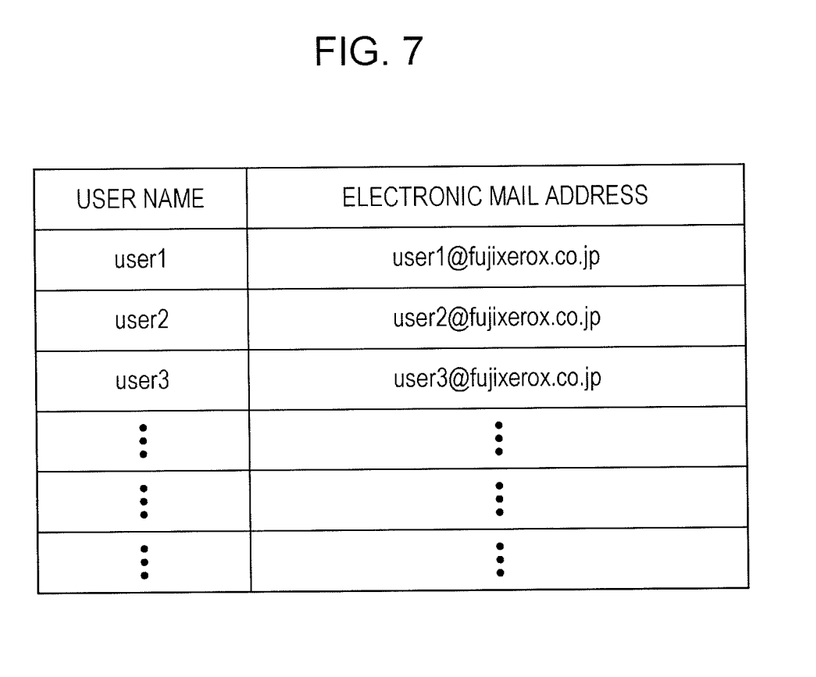
FIG. 7 is a diagram illustrating a correspondence table of user information and transmission destination electronic mail addresses in the exemplary embodiment of the invention.

On the installation screen of FIG. 6, the user specifies the application name and the server name of the server storing the application to be installed, and inputs the electronic mail address serving as the transmission destination of the log information of the specified application, the number of executions of the application, the transmission period, and the transmission target (Step S103). In this process, if the user information and the electronic mail address of the user permitted to log in are previously stored in the memory 39 in association with each other, as illustrated in FIG. 7, the managing unit 31 refers to the memory 39, and inputs in the transmission destination on the installation screen the electronic mail address corresponding to the user information of the user permitted to log in. For example, if the user name of the user permitted to log in at Step S101 is user1, the managing unit 31 refers to a correspondence table as illustrated in FIG. 7, which is stored in the memory 39, and inputs in the transmission destination on the installation screen an electronic mail address user1@fujixerox.co.jp corresponding to the user name user1.

Further, if the memory 39 stores an address table registering, for example, electronic mail addresses of respective users as the transmission destination of the image data read by, for example, the scanner 37, the user may be allowed to select, from the address table stored in the memory 39, an electronic mail address serving as the transmission destination of the log information, when inputting the transmission destination of the log information at Step S103.

In the present exemplary embodiment, description will be made of a case in which the following inputs are made: user1 as the user name of the user who has logged in the image processing apparatus 3, svr1 as the server name of the server 4 in FIG. 1, apl1 as the application name, user1@fujixerox.co.jp as the electronic mail address of the terminal apparatus 2, 100 as the number of executions, within one month as the transmission period, and error only as the target for which the log information is transmitted.

Figure 8:
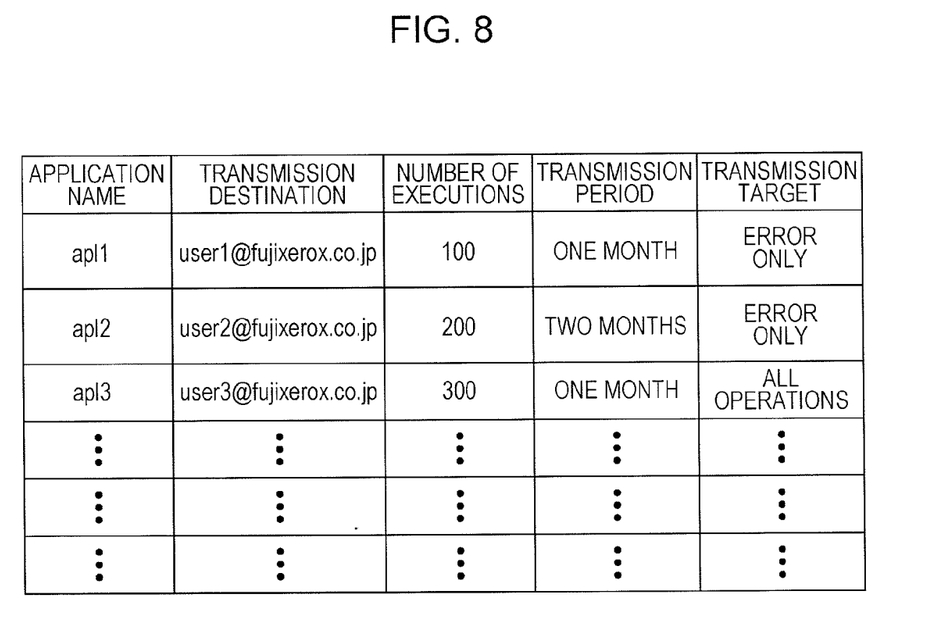
FIG. 8 is a diagram illustrating a correspondence table of applications and setting information in the exemplary embodiment of the invention.

Then, the above-described inputs are completed, and an execute installation button is pressed (YES at Step S104). Thereby, the installation starts (Step S105). Then, the managing unit 31 sets, for the installed application, the contents input on the installation screen. The application and the contents set therefor are then stored in the memory 39, and are managed in association with one another by the managing unit 31, as illustrated in FIG. 8. In a correspondence table illustrated in FIG. 8, the application name, the transmission destination of the log information, the number of executions, the transmission period, and the transmission target are managed in association with one another. Herein, the number of executions refers to the upper limit value of the number of executions of the application, for which the log information is transmitted. If the number of executions of the installed application is equal to or less than the above-described number of executions, the transmission of the log information is performed. Further, as for the transmission period, if the period having elapsed after the installation of the application into the image processing apparatus 3 is within the above-described transmission period, the transmission of the log information is performed. Further, the transmission target indicates the limitation of the cases in which the log information is to be transmitted. Specifically, the transmission target indicates which one of the following is to be transmitted: the log information in a case in which the executed application is normally completed, the log information in a case in which the executed application is interrupted, and all log information of the executed application.

Further, if the application is interrupted without being installed, a cancel button is pressed. Thereby, the installation screen of FIG. 6 is cleared without the start of the installation (NO at Step S104).

Figure 9:
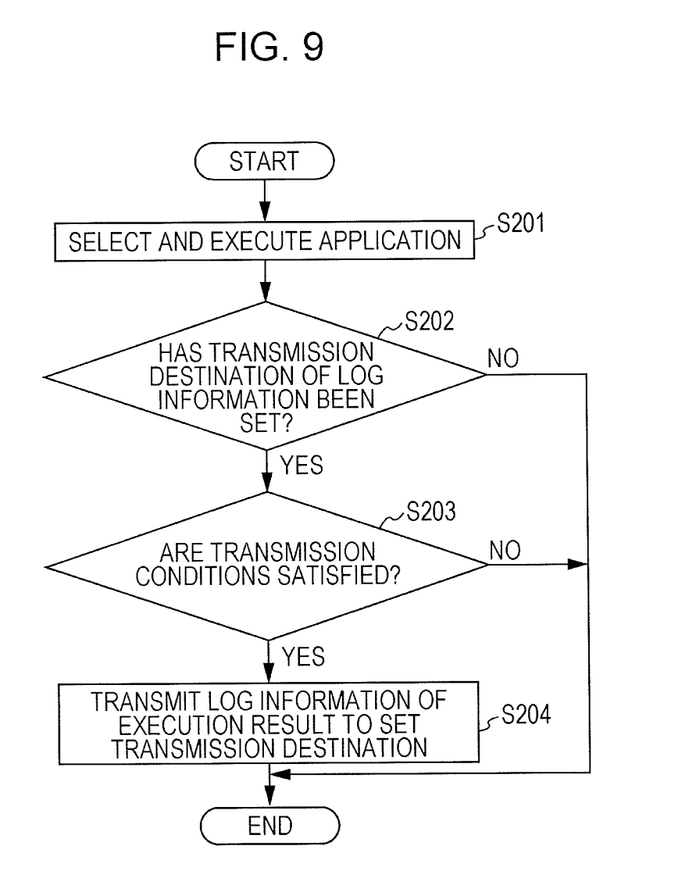
FIG. 9 is a flowchart for explaining a flow of a log information transmission process in the exemplary embodiment of the invention.

Subsequently, an operation of the image processing apparatus 3 for executing the installed application will be described in detail with reference to FIG. 9.

A user first operates the UI panel 30, and selects an application to be executed from the applications installed in the image processing apparatus 3. Then, the executing unit 33 executes the selected application (Step S201).

Then, the controller 34 instructs the image data communicating unit 38 to transmit to the terminal apparatus 2 the image data of the image read by the scanner 37, and instructs the printer 36 to output on a sheet the image read by the scanner 37.

Then, upon completion of the execution of the application, whether or not the transmission destination has been set for the application is determined (Step S202). If the transmission destination has not been set, the application is completed. If the transmission destination has been set, the procedure proceeds to Step S203. Then, determination of the transmission conditions is performed at Step S203.

Herein, the managing unit 31 refers to the conditions set at Step S103, and instructs the controller 34 to cause the log information transmitting unit 35 to transmit the log information to the electronic mail address user1@fujixerox.co.jp of the terminal apparatus 2, if the number of executions of the application is equal to or less than 100, if a period equal to or shorter than one month has elapsed after the installation of the application, and if some error has occurred during the execution of the application and interrupted the application. Then, the controller 34 controls the log information transmitting unit 35 to transmit, to the terminal apparatus 2 via the network 10, the log information collected until the interruption of the application (Step S204).

For example, it is now assumed that a failure to transmit an image to the terminal apparatus 2 specified as the transmission destination of the image has occurred in the first execution of the application after the lapse of ten minutes since the installation thereof. In this case, the executing unit 33 interrupts the execution of the application, and instructs the controller 34 to cause the log information transmitting unit 35 to transmit the log information of the operations performed until the interruption of the executed application.

Meanwhile, if the transmission conditions do not match the conditions set at Step S103, the application is completed.

Further, when deleting the user information from the memory 39, the managing unit 31 deletes the settings of the application set with the transmission destination on the basis of the user information to be deleted. In this case, when the user information is to be deleted, the managing unit 31 deletes from the memory 39 the settings of the application and the user information managed in association with one another as illustrated in FIG. 8. For example, it is now assumed that, in the image processing apparatus 3 installed in a company, a developer has developed an application apl2 and set user2@fujixerox.co.jp, which is an electronic mail address of the developer, as the transmission destination of the log information of the application apl2. If the user information of the developer is deleted by reason of, for example, leaving the company, the managing unit 31 deletes the electronic mail address user2@fujixerox.co.jp serving as the transmission destination corresponding to the application apl2 in the correspondence table illustrated in FIG. 8.

Further, in the above description of the present exemplary embodiment, the login is permitted with the user information input on the login screen. The present invention, however, is not limited thereto. For example, a user may be identified and permitted to log in, when a readable recording medium, such as an IC (Integrated Circuit) card, storing the user information is read. In this case, a device for reading the IC card may be newly provided, and the managing unit 31 may perform the login process on the basis of the read user information.

Further, in the above description of the present exemplary embodiment, the login information is transmitted when an error occurs during the execution of the application. The present invention, however, is not limited thereto. For example, a condition may be set to transmit the log information both when the application has normally been completed and when an error has occurred during the execution of the application and interrupted the application. Thereby, it is possible to observe the frequency of errors occurring during the execution of the application.

In the above description of the present exemplary embodiment, the above-described application is used in the image processing apparatus 3. The application, however, is not limited to the above-described application, as long as the application is installable in the image processing apparatus 3. Particularly, an application using at least some of image processing functions of the image processing apparatus 3 is desirable. The image processing functions include sheet transport, document transport, scanning, printing, image processing on image data (color conversion, image size conversion, image format conversion, and generation of raster image, for example), and post-processing on a sheet after the printing (stapling, punching, and binding, for example). Further, the application may include a process based on the operation by the user on the image processing apparatus 3 (operation of buttons on the touch panel, for example), and the log information may include information regarding the operation by the user, information regarding the operation of another application which operates in accordance with an instruction from the executed application, and information regarding the operation of the image processing apparatus 3 which operates in accordance with an instruction from the executed application. The information is not limited, as long as the information relates to the execution of an application.

Further, in the above description of the present exemplary embodiment, the upper limit of the number of executions of the application is set as a condition for transmitting the log information. However, the upper limit of the number of transmissions of the log information may be set.

Further, in the above description of the present exemplary embodiment, the electronic mail address serving as the transmission destination of the log information is set for the installed application. However, if the electronic mail address serving as the transmission destination of the log information is registered in the application to be installed, the setting may be configured to, in the transmission of the log information, (1) give priority to the electronic mail address registered in the application, (2) give priority to the electronic mail address input on the installation screen, or (3) transmit the log information to both of the electronic mail addresses. For example, if priority is given to the electronic mail address input on the installation screen, the log information and a URL (Uniform Resource Locator) for accessing a confirmation screen for inputting information of whether or not to transmit the log information to the electronic mail address registered in the application may be transmitted, in the transmission of the log information, to the electronic mail address set in the installation of the application, and the transmission of the log information may be performed on the basis of the result of input, on the confirmation screen, of the information of whether or not to transmit the log information. In the above-described example, the URL for accessing the image processing apparatus 3 is transmitted. However, any other configuration allowing the image processing apparatus 3 to acquire the confirmation result may be used. The confirmation result may be acquired from an electronic mail replying to the image processing apparatus 3 or from a user interface of the image processing apparatus 3.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    at least one processor which implements:
        an installing unit configured to install an automation program for executing a series of operations;
        a setting unit configured to set a transmission destination and a condition indicating an error related to the series of operations for the automation program when the automation program is installed;
        an executing unit configured to execute the series of operations using the installed automation program;
        a log information generating unit configured to generate log information regarding the execution of the series of operations; and
        a transmitting unit configured to transmit the log information to the transmission destination in response to the condition indicating that the error related to the series of operations has occurred.

2. The image processing apparatus according to claim 1, wherein the error related to the series of operations is associated with at least one of a timing of transmission by the transmitting unit and contents of the log information.

3. The image processing apparatus according to claim 1, wherein the setting unit sets, as the condition indicating the error related to the series of operations, a number of executions of the series of operations by the executing unit, or a predetermined period having elapsed after the installation of the automation program.

4. The image processing apparatus according to claim 1, wherein the setting unit sets, as the condition indicating the error related to the series of operations, the occurrence of an error during the execution of the series of operations executed by the executing unit.

5. The image processing apparatus according to claim 1, wherein the setting unit sets, as the condition indicating the error related to the series of operations, the log information regarding a process corresponding to an error having occurred during the execution of the series of operations executed by the executing unit.

6. The image processing apparatus according to claim 1, further comprising:
    a memory configured to store user information including a transmission destination of a user; and
    a setting unit, implemented by the at least one processor, configured to identify the user through a login process,
    wherein the transmission destination of the log information is the transmission destination of the user stored in the memory.

7. The image processing apparatus according to claim 6, wherein the at least one processor further implements:
    a deleting unit configured to delete, in response to deleting the user information from the memory, the transmission destination used by the transmitting unit to transmit the log information.

8. The image processing apparatus according to claim 1, further comprising:
    a user interface (UI) panel configured for inputting the transmission destination.

9. The image processing apparatus according to claim 8, wherein the UI panel is further configured to receive an input for causing the automation program to begin installing.

10. The image processing apparatus according to claim 1, wherein the condition is a limit associated with a number of executions of the series of operations using the installed automation program, and
    in response to the executing unit executing the series of operations in a manner that satisfies the condition, the transmitting unit transmits the log information to the transmission destination.

11. The image processing apparatus according to claim 1, wherein the condition is associated with contents of the log information, and
    in response to the contents of the log information satisfying the condition, the transmitting unit transmits the log information to the transmission destination.

12. The image processing apparatus according to claim 1, wherein the installing unit is further configured to install a second automation program for executing a second series of operations,
    the setting unit is further configured to set a second transmission destination and a second condition indicating an error related to the second series of operations for the second automation program when the second automation program is installed,
    the executing unit is further configured to execute the second series of operations using the installed second automation program, the log information generating unit is further configured to generate second log information regarding the executing of the second series of operations, and the transmitting unit is further configured to transmit the second log information to the second transmission destination in response to the second condition indicating that the error related to the second series of operations has occurred.

13. The image processing apparatus according to claim 1, wherein the condition associated with the automation program and the transmission destination is the occurrence of an error in the executing of the series of operations.

14. An image processing method comprising:
    installing an automation program for executing a series of operations to an image processing apparatus;
    setting a transmission destination and a condition indicating an error related to the series of operations for the automation program when the automation program is installed;
    executing the series of operations using the installed automation program;
    generating log information regarding the series of operations; and
    transmitting the log information to the transmission destination in response to the condition indicating that the error related to the series of operations has occurred.

15. The image processing method according to claim 14, wherein the image processing method further comprises:
    installing a second automation program for executing a second series of operations to the image processing apparatus in association with a second transmission destination and a second condition indicating an error related to the second series of operations;
    executing the second series of operations using the installed second automation program;
    generating second log information regarding the executing of the second series of operations; and
    transmitting the second log information to the second transmission destination in response to the second condition indicating that the error related to the second series of operations has occurred.

16. The image processing method according to claim 14, wherein the condition associated with the automation program and the transmission destination is the occurrence of an error in the executing of the series of operations.

17. A non-transitory computer readable medium storing a program for causing a computer to execute:
    installing an automation program for executing a series of operations to an image processing apparatus;
    setting a transmission destination and a condition indicating an error related to the series of operations for the automation program when the automation program is installed;
    executing the series of operations using the installed automation program;
    generating log information regarding the series of operations; and
    transmitting the log information to the transmission destination in response to the condition indicating that the error related to the series of operations has occurred.

18. The non-transitory computer readable medium according to claim 17, wherein the condition associated with the automation program and the transmission destination is the occurrence of an error in the executing of the series of operations.

19. The non-transitory computer readable medium according to claim 17, wherein the program further causes the computer to execute:
    installing a second automation program for executing a second series of operations to the image processing apparatus;
    setting a second transmission destination and a second condition indicating an error related to the second series of operations for the second automation program when the second automation program is installed;
    executing the second series of operations using the installed second automation program;
    generating second log information regarding the executing of the second series of operations; and
    transmitting the second log information to the second transmission destination in response to the second condition indicating that the error related to the series of operations has occurred.

20. An image processing apparatus comprising:
    at least one processor which implements:
    an installing unit configured to install a program information item for executing a preset process;
    a setting unit configured to set a transmission destination and a condition related to the preset process for the program information item when the program information item is installed;
    an executing unit configured to execute the preset process using the installed program information item;
    a log information generating unit configured to generate log information regarding the execution of the preset process; and
    a transmitting unit configured to transmit the log information to the transmission destination in response to the condition related to the preset process being satisfied.

* * * * *